United States Patent [19]

Johnson

[11] 4,357,958

[45] Nov. 9, 1982

[54] NON-RETURN VALVES

[75] Inventor: Colin C. Johnson, Woodford, England

[73] Assignee: British Aerospace Public Limited Company, Weybridge, England

[21] Appl. No.: 200,586

[22] Filed: Oct. 24, 1980

[30] Foreign Application Priority Data

Oct. 31, 1979 [GB] United Kingdom ............... 7937770

[51] Int. Cl.³ ............................................. F16K 15/14
[52] U.S. Cl. .................................... 137/846; 137/850
[58] Field of Search ............... 137/844, 846, 847, 848, 137/849, 850, 853, 854, 512.15

[56] References Cited

U.S. PATENT DOCUMENTS 2,369,170  2/1945  Motsinger .......................... 137/848
2,897,835  8/1959  Philippe ........................... 137/849 X
3,342,208  9/1967  Steffes ............................ 137/853 X
4,217,921  8/1980  Gidnel ........................... 137/512.15

FOREIGN PATENT DOCUMENTS 218988   2/1910  Fed. Rep. of Germany ...... 137/853
1116405  6/1968  United Kingdom .

Primary Examiner—Robert G. Nilson
Attorney, Agent, or Firm—Cushman, Darby & Cushman

[57] ABSTRACT

A non-return valve comprises a valve body 1 which supports the upstream end of a valve closure means 2 formed by a sleeve of flexible but impermeable material. Closure support means 3 of a skeletal structure are positioned within the valve closure means 2. Forward flow through the valve is relatively unimpeded, but reverse flow causes the valve closure means 2 substantially sealingly to collapse upon the closure support means 3. In one of the principal applications of this non-return valve, the valve body 1 is the efflux duct of a fan.

9 Claims, 3 Drawing Figures

NON-RETURN VALVES

BACKGROUND AND SUMMARY OF THE INVENTION

This invention relates to non-return valves which allow high volume flow rates in a selected direction through a fluid passage but change to a non-return configuration at low reverse pressure differentials along the passage.

It is an aim of this invention to provide a relatively light non-return valve in which the discontinuity and functional losses of the flow through the valve are reduced compared to those found in conventional non-return valves, whilst maintaining a relatively high speed and effective shut off. It is a further aim of this invention to provide a non-return valve which can be positioned closely downstream of a fan, thereby assisting the design of compact equipment employing a fan in combination with a non-return valve.

According to this invention there is provided a non-return valve which comprises a relatively inflexible apertured valve body which supports the upstream end of valve closure means which is formed by a sleeve of flexible but impermeable sheet material, the valve body and sleeve together defining a fluid passage, and closure support means formed by a skeletal structure arranged within the fluid passage so that forward flow from the upstream end of the sleeve to the downstream end causes the sleeve to inflate and allow relatively unimpeded flow therethrough whilst reverse flow causes the sleeve substantially sealingly to collapse upon the skeletal structure.

Advantageously the sleeve includes a generally frusto-conical downstream portion, the diameter of the portion decreasing towards the downstream end and the included angle of the frusto-conical portion preferably lies in the range of from 6° to 10°. The ratio of the axial length of the sleeve to the maximum transverse dimension of the upstream end of the fluid passage is preferably not less than 0.8:1 and a ratio of 1.2:1 has been found to be particularly effective. The sleeve can conveniently be formed of a rubberised fabric material. The skeletal structure may be of generally frusto-conical form, the larger end of the structure lying upstream of the smaller end and adjacent the upstream end of the sleeve and the included angle of the skeletal structure is preferably not greater than 120° to reduce the possibility of leakage paths forming when the valve is in its non-return mode. This invention also extends to an arrangement in which the valve body is the efflux duct of a fan.

One embodiment of a valve, according to the invention, is described by way of example with reference to the accompanying drawings in which:

DETAILED DESCRIPTION OF THE INVENTION

Figure 1:
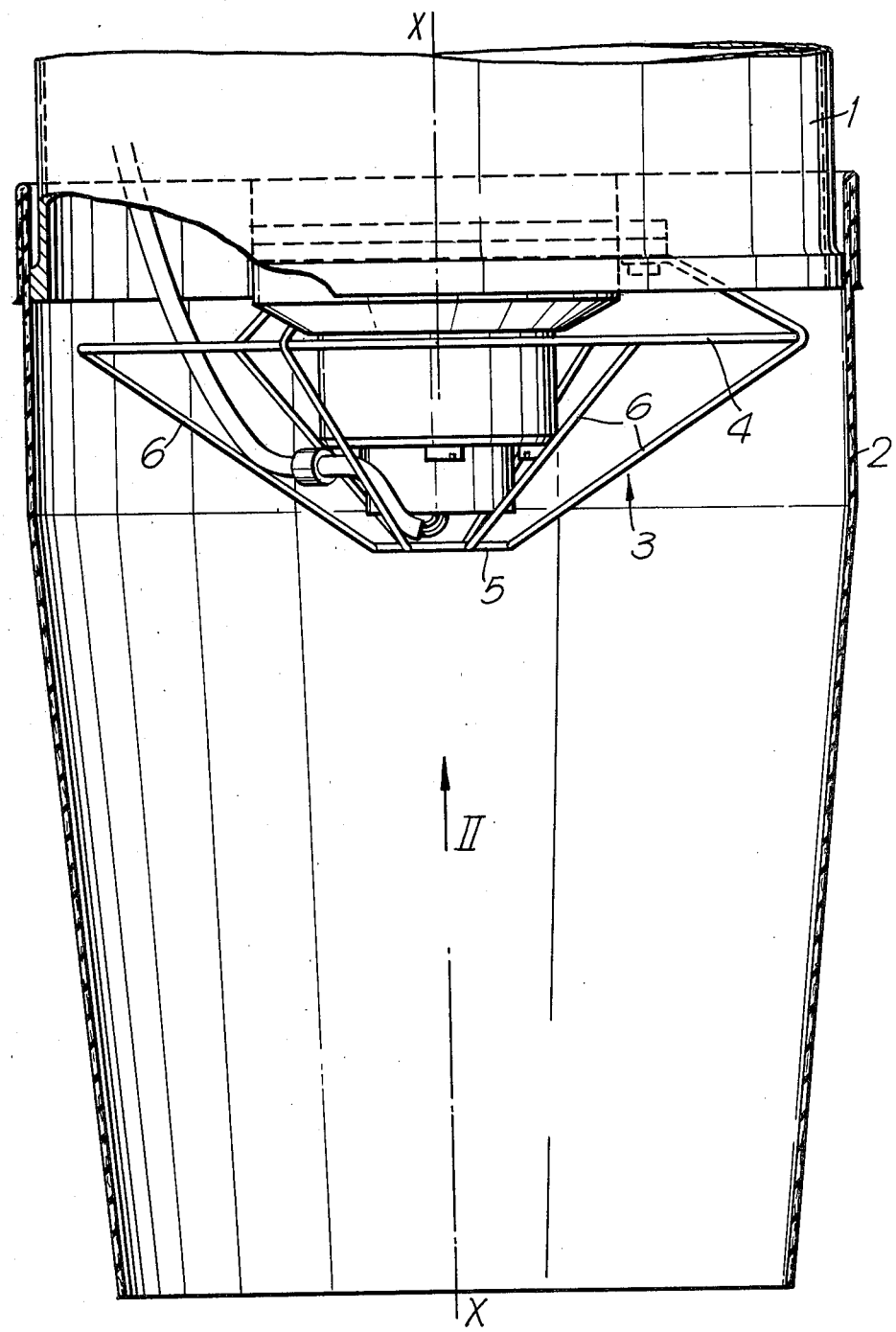
FIG. 1 is a sectional side elevation of a valve, in a flow configuration, the section including the axis of symmetry X - X.
Figure 2:
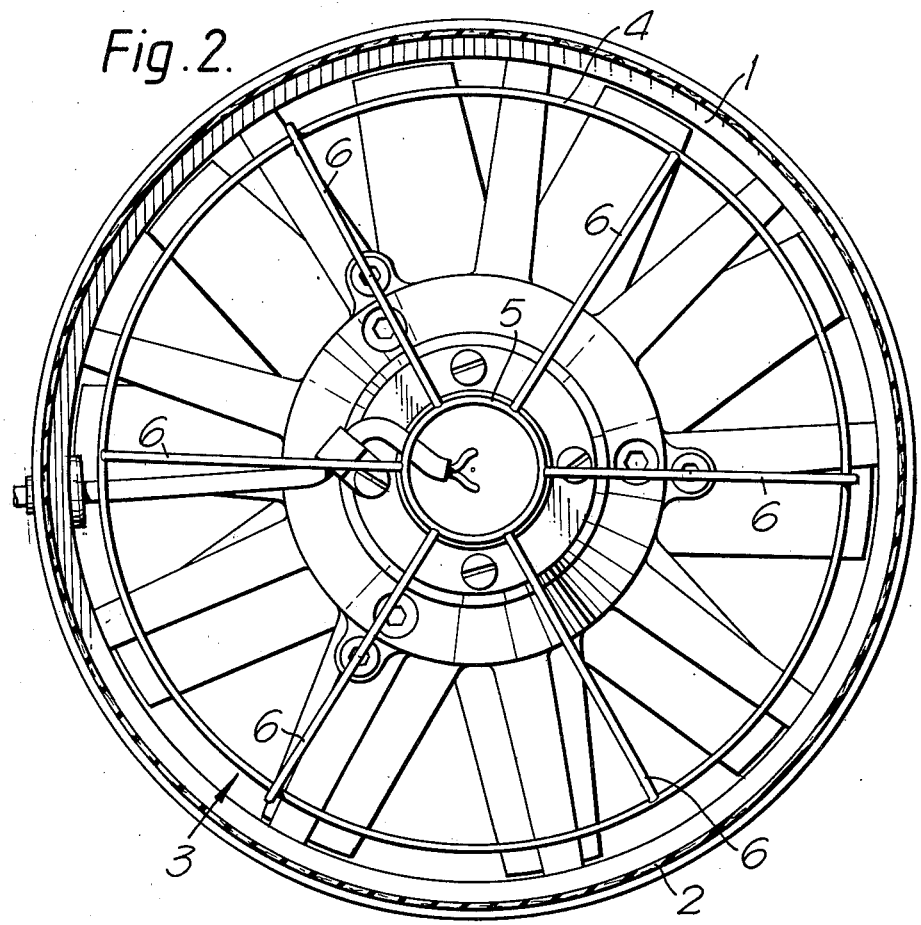
FIG. 2 is a view on Arrow II of FIG. 1.

In the Figures, a fan has an efflux duct 1 of circular transverse cross section. Attached to its downstream lip is a valve closure means in the form of a sleeve 2, through which the efflux flows, of flexible but impermeable material.

Also attached to the duct 1 and located within the closure means is a closure support means in the form of a skeletal structure 3 which is arranged to not seriously impede the efflux flow but to provide a support for the sleeve 2 when the latter is in a collapsed state. It is thus formed of an upstream hoop 4, a downstream hoop 5 of smaller diameter, and six support struts 6 connecting the two.

The sleeve 2 has the following characteristics:
Material: rubberised, rip proof, Terylene (Registered Trade Mark) typically 0.003 inches thick.
Dimensions: the ratio of axial length to duct diameter should not be less than 0.8; in the present example it is about 1.2 and the sleeve is formed with an included angle of from 6° to 10° so that, when inflated, it assumes a frusto-conical form.

The skeletal structure 3 has the following characteristics:
Material: metal wire or tube.
Dimensions: to fit within the sleeve 2 of generally frusto-conical form with an included angle of about 120°.

Figure 3:
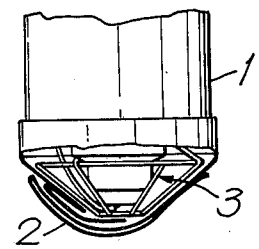
FIG. 3 is a reduced scale version of FIG. 1, but with the valve in a non-return configuration.

In use, the fan efflux flow passes through the sleeve 2 thereby inflating it to the flow condition indicated in FIG. 1. Should reverse flow conditions occur, when, for example, the fan fails and the pressure differential is such that a reverse flow takes place through the failed fan, the sleeve 2 sealingly collapses upon the skeletal structure 3, thereby assuming the non-return flow configuration of FIG. 3.

The embodiment illustrated is suitable for airborne radar cooling. Such cooling is found to require three fans adjacent to one another, two being in continuous operation and one on stand-by in case of failure of one or more of the others. A non-return valve as described is fitted to each fan, so that reverse flow through the quiescent fan or through a failed fan is prevented.

Sleeves 2 of 1 to 6 inches diameter are found to function well, but in the smaller ranges a thinner material is desirable. Similarly, a thinner material is desirable for embodiments requiring to prevent reverse flow at very low pressure differentials.

If the 120° included angle of the structure 3 is greatly increased, it is found that excessive creasing of the sleeve material results in inadequate sealing in the non-return condition.

Although the above embodiment of non-return valve is described and illustrated with particular reference to use downstream of a fan, the non-return valve of this invention may find various other applications in flow systems; for example it may be positioned in a length of duct to prevent reverse flow therethrough.

Typical weights of non-return valves constructed in accordance with this invention are as follows:
a valve having a circular cross-sectional flow passage of 25mm. diameter may have a weight of 7 grams, and,
a valve having a diameter of 150 mm. may have a weight of 50 grams.

I claim:
1. A non-return valve which comprises a relatively inflexible valve body, valve closure means formed by an inflatable sleeve of relatively thin flexible but impermeable sheet material and closure support means, the valve body supporting the upstream end of the valve closure means, the valve body and the valve closure means together defining a fluid passage, the closure support means being of open-frame skeletal structure and arranged wholly within the fluid passage with a major portion of the valve closure means lying downstream of the closure support means, so that forward flow from the upstream end of the valve closure means to the downstream end causes the valve closure means to inflate and allow relatively unimpeded flow therethrough whilst reverse flow causes the valve closure means substantially sealingly to collapse upon itself and the closure support means.

2. A non-return valve as recited in claim 1, wherein the valve closure means includes a generally frusto-conical downstream portion, the diameter of the portion decreasing towards the downstream end.

3. A non-return valve as recited in claim 2, wherein the included angle of the frusto-conical portion lies in the range of from 6° to 10°.

4. A non-return valve as recited in claim 1, wherein the ratio of the axial length of the valve closure means to the maximum transverse dimension of the upstream end of the fluid passage is not less than 0.8:1.

5. A non-return valve as recited in claim 4, wherein the ratio is approximately 1.2:1.

6. A non-return valve as recited in claim 1, wherein the closure support means is of generally frusto-conical shape, the larger end of the closure support means lying upstream of the smaller end and adjacent the upstream end of the valve closure means.

7. A non-return valve as recited in claim 6, wherein the included angle of the closure support means is not greater than 120°.

8. A non-return valve as recited in claim 1, wherein the closure support means is formed of a rubberised fabric material.

9. A non-return valve as recited in claim 1, wherein the valve body is the efflux duct of a fan.

* * * * *